(12) United States Patent
Klose et al.

(10) Patent No.: US 10,215,976 B2
(45) Date of Patent: Feb. 26, 2019

(54) COUPLING DEVICE FOR AN OPTICAL WAVEGUIDE HAVING A CENTERING DEVICE

(71) Applicant: Scholly Fiberoptic GmbH, Denzlingen (DE)

(72) Inventors: Bernhard Klose, Denzlingen (DE); Clemens Meier, Seelbach (DE); Roland Reichenbach, Glottertal (DE); Volker Gruber, Alpirsbach (DE); Jonas Moosmann, Schramberg (DE)

(73) Assignee: Schölly Fiberoptic GmbH, Denzlingen (DE)

( * ) Notice: Subject to any disclaimer, the term of this patent is extended or adjusted under 35 U.S.C. 154(b) by 9 days.

(21) Appl. No.: 15/672,719

(22) Filed: Aug. 9, 2017

(65) Prior Publication Data

US 2018/0052317 A1 Feb. 22, 2018

(30) Foreign Application Priority Data

Aug. 16, 2016 (DE) .................. 10 2016 009 840

(51) Int. Cl.
*G02B 23/24* (2006.01)
*G02B 6/42* (2006.01)
*F21V 8/00* (2006.01)

(52) U.S. Cl.
CPC ....... *G02B 23/2469* (2013.01); *G02B 6/4226* (2013.01); *G02B 6/4298* (2013.01); *G02B 6/0006* (2013.01)

(58) Field of Classification Search
CPC .............. G02B 23/2469; G02B 6/4226; G02B 6/4298; G02B 6/0006
See application file for complete search history.

(56) References Cited

U.S. PATENT DOCUMENTS 4,101,197 A * 7/1978 Kent .................... G02B 6/3865
250/227.24

FOREIGN PATENT DOCUMENTS

DE 4024677 2/1992
DE 102016004677 10/2017

* cited by examiner

*Primary Examiner* — David V Bruce
(74) *Attorney, Agent, or Firm* — Volpe and Koenig, P.C.

(57) ABSTRACT

A coupling device (9) for an optical waveguide (8), in particular for an endoscope (2) or a light source (3), having an optical waveguide receptacle (11) aligned with a light-coupling optical unit (10), and having a centering device (12) for aligning an optical waveguide (8) with respect to the optical axis (26). The centering device (12) has at least two transmission elements (25) acted upon by a spring (30), and has centering elements (19), and wherein the spring force is distributed by a transmission element (25) uniformly to all the centering elements (19).

14 Claims, 3 Drawing Sheets

COUPLING DEVICE FOR AN OPTICAL WAVEGUIDE HAVING A CENTERING DEVICE

INCORPORATION BY REFERENCE

The following documents are incorporated herein by reference as if fully set forth: German Patent Application No. 102016009840.6, filed Aug. 16, 2016.

BACKGROUND

The invention relates to a coupling device for an optical waveguide, having a light-coupling optical unit, having an optical waveguide receptacle aligned with the light-coupling optical unit, and having a centering device with at least two force-actuated centering elements which are arranged around the optical waveguide receptacle and by which an optical waveguide inserted in the optical waveguide receptacle is centered with respect to the optical axis of the light-coupling optical unit.

Such a coupling device is used, for example, at light sources for endoscope systems, in order to couple an optical waveguide to this light source.

Devices of this kind are known from the German patent application DE 10 2016 004 677.5, for example.

In the known coupling devices, at least two centering elements which are movable independently of each other are formed at the end of the optical waveguide receptacle in the insertion direction, which centering elements are acted upon by a spring force in order to center the inserted optical waveguide.

A problem with coupling devices of this kind is that, if the inserted optical waveguide is skewed, an individual centering element may be deflected alone, as a result of which the alignment is no longer provided.

When separate springs are used to act individually on the centering elements, there is the additional problem that the spring forces applied have to be adjusted and adapted to each other.

SUMMARY

The object of the invention is therefore to make available a coupling device of the aforementioned type with an improved centering device.

This object is achieved by a coupling device having one or more features of the invention. The coupling device according to the invention is characterized in particular in that the centering device has a transmission element which is movable in a guided manner and which is arranged between the centering elements and a force actuation, such that the centering elements are force-actuated together.

According to the invention, the centering elements are no longer acted upon directly by a force. Instead, force is applied to the transmission element, for example by a spring. The transmission element transmits and distributes this force uniformly to all the centering elements. In this way, the invention achieves a uniformity of the force applied to all the centering elements.

To achieve an exact alignment with respect to the optical axis, it is therefore no longer necessary to adjust the individual centering elements or the individual springs. As a result of the uniform transmission and distribution of the force to all the centering elements, centering takes place automatically.

Since the movement of the transmission element is guided, it is also possible to prevent an individual centering element from being deflected independently of the others. If in fact an individual centering element is deflected, for example by a skewed optical waveguide, the centering element applies a unilateral force to the transmission element. However, since the movement is tightly guided, this force causes a tilting of the transmission element. In this way, the transmission element blocks in the guide and thus prevents the further deflection of the individual centering element.

The coupling device according to the invention thus provides much easier and safer centering of an optical waveguide.

It is advantageous in particular if the transmission element is guided in a linearly movable manner by a sliding guide with a clearance fit. The clearance fit permits a linear movement of the transmission element. Here, due to the narrow tolerances, a slight unilateral force, for example caused by an individually deflected centering element, leads to skewing and therefore blocking of the transmission element.

In an advantageous embodiment of the invention, the transmission element is ring-shaped, and the optical waveguide receptacle is guided through a central opening of this ring shape. In this way, the transmission element has a large engagement surface for the spring force and affords a large bearing surface for the individual centering elements. In addition, a sliding guide can be realized in a particularly simple way by the ring shape. Finally, the ring shape ensures in a particularly simple way that a deflection of an individual centering element leads to skewing and therefore blocking of the transmission element.

In an advantageous embodiment of the invention, the sliding guide of the transmission element engages internally for example on a cylinder surface of the transmission element, or also externally on a cylinder surface of the transmission element.

In addition to the ring shape, the transmission element can have, for example, the shape of a partial ring or also other cross sections, for example an oval or other non-round cross section.

Preferably, each centering element has two limbs and, lying between these, a pivot point, with a first limb bearing on an inserted optical waveguide and a second limb being acted upon by the transmission element. The transmission element can in this case bear directly on the second limb, such that there is a direct transmission of force from the transmission element to the centering elements. Through the arrangement of the pivot point between the two limbs, the force transmission is effected via a lever, which also permits a conversion of the force.

The design of the transmission element with a ring shape or a partial ring shape and the formation of two limbs on the centering elements also has the advantage that the actuation point for the centering elements can be arranged very far away from a rotation point of the centering elements. This permits a high level of resistance of the transmission element against opening of the centering elements during tilting of the optical waveguide.

The points of contact of the centering elements to the optical waveguide and/or the pivot points of the centering elements can be arranged in different axial planes. It is thus possible to prevent the individual centering elements from touching each other.

It is particularly advantageous if the centering elements are each L-shaped, with a pivot point, in particular the aforementioned pivot point, being able to be arranged at the L bend. Here, the L bend can be characterized, for example, as the point where two limbs of the L shape meet. By this arrangement, for example, a force acting in an axial direction on the second limbs can be converted to a radial force acting on an optical waveguide. This deflection of the force application permits a compact design of the centering device.

The transmission element distributes the force uniformly to all the centering elements. It is thus possible, and particularly expedient, if the transmission element is acted upon by an individual spring, for example a helical spring. In this way, there is no need to coordinate several springs with each other or to precisely adjust the engagement points.

In an expedient refinement of the invention, a blocking device is formed upstream from the coupling device in the insertion direction, by which blocking device the inserted optical waveguide can be blocked in the optical waveguide receptacle. Blocking of the optical waveguide prevents inadvertent release of the optical waveguide and therefore ensures an uninterrupted transmission of light.

The blocking device can in principle be of any desired configuration, for example in the form of a wire grip.

The blocking device can be opened here by an actuation element, for example by rotation about an axis oriented parallel to the optical waveguide.

However, it is particularly advantageous if the blocking device can be actuated by a spring force. In this way, a trigger force can be defined by the spring force.

It is particularly expedient if this spring force is applied by the same spring element that acts on the transmission element. In this way, the construction of the coupling device is particularly simple and cost-effective, since only a single spring is needed for centering and blocking an optical waveguide.

In an advantageous embodiment of the invention, the limb of the centering element facing toward the optical waveguide has a receiving groove which extends in the axial direction and in which the optical waveguide bears in a fixed position in order to avoid slipping out transversely with respect to the direction of extent. In particular, all the centering elements have such a receiving groove.

The centering device according to the invention can have two, three or more centering elements.

In a preferred use of the coupling device according to the invention, in particular as described above and/or in accordance with one of the claims directed to a coupling device, an endoscope is coupled to a light source via this coupling device. An arrangement of endoscope and light source is thus obtained in which an endoscope is coupled to a light source via the coupling device according to the invention.

BRIEF DESCRIPTION OF THE DRAWINGS

The invention is explained in more detail below on the basis of a preferred illustrative embodiment and with reference to the attached drawings, in which.

DETAILED DESCRIPTION OF THE PREFERRED EMBODIMENTS

Figure 1:
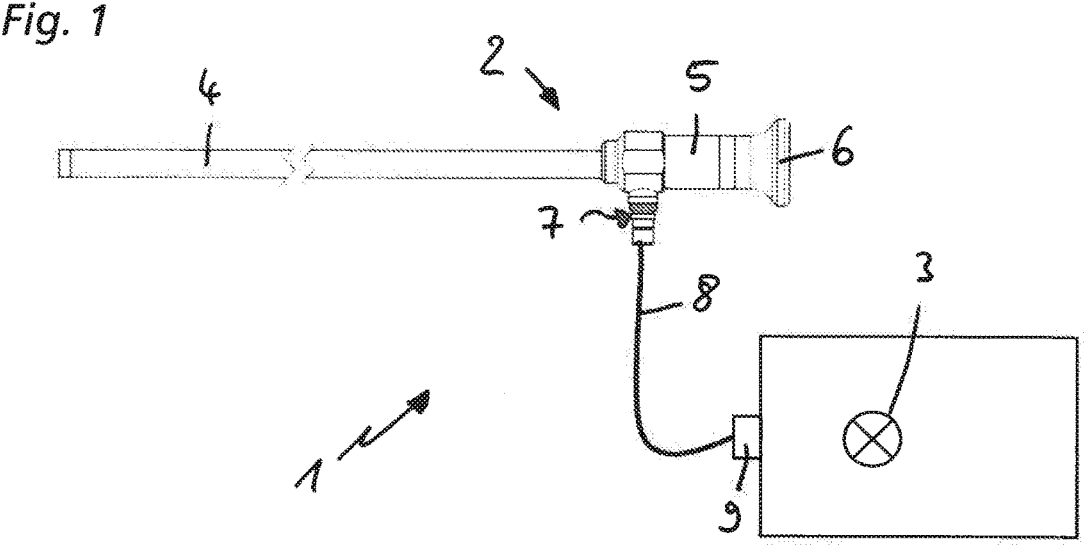
FIG. 1 shows a schematic view of an endoscope arrangement.

FIG. 1 shows a schematic view of an endoscope arrangement designated overall by reference sign 1 and having an endoscope 2 and a light source 3.

The endoscope 2 has a rigid endoscope shaft 4 and an endoscope head 5 with an eyepiece 6 and an optical waveguide input 7 for feeding in light. The optical waveguide input 7 is connected to the light source 3 by an optical waveguide 8. A coupling device 9 is arranged at the light source 3 and couples the optical waveguide 8 to the light source 3. By virtue of the coupling, it is possible to use the light source 3 for different endoscopes. Such a coupling device 9 could likewise be arranged at the optical waveguide input 7 of the endoscope 2. Of course, the endoscope arrangement 1 shown here serves only to illustrate the invention, and the latter is not in any way limited to this example. The endoscope 2 can, for example, also have a flexible shaft and/or a video head without eyepiece.

Figure 2:
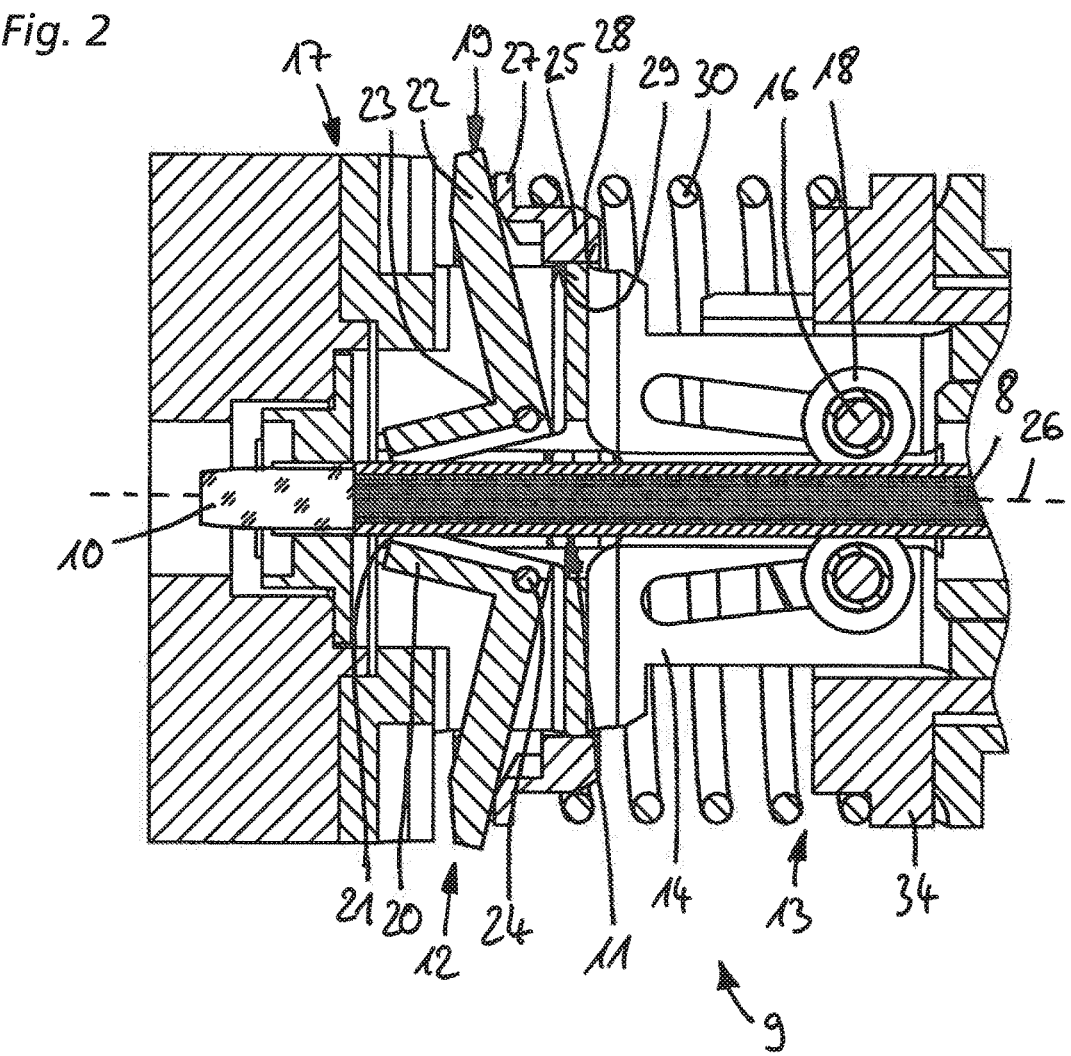
FIG. 2 shows a longitudinal section through a coupling device according to the invention.

FIG. 2 shows a longitudinal section through a coupling device 9 according to the invention. The coupling device 9 has a light-coupling optical unit 10 which is approximately cylindrical in the example and serves as a coupling point through which light passes in or out. For low-loss coupling, it is advantageous if the light-coupling optical unit 10 bears flat on an optical waveguide 8. In order to ensure this in different types of optical waveguides, the light-coupling optical unit 10 can be axially movable and spring-loaded, such that the light-coupling optical unit 10 is pressed against an optical waveguide 8 by the spring force. This ensures that the light-coupling optical unit 10 bears flat on an optical waveguide 8.

In order to receive an optical waveguide 8, the coupling device 9 has an optical waveguide receptacle 11, which is aligned with the light-coupling optical unit 10.

The coupling device 9 moreover has a centering device 12 according to the invention and a blocking device 13 for the optical waveguide 8.

The blocking device 13 is arranged upstream from the centering device 12 in the insertion direction. The blocking device 13 has an insertion position, in which an optical waveguide 8 can be inserted into the optical waveguide receptacle 11, and a clamping position, in which an optical waveguide 8 is fixed.

The coupling device 9 in the example has an axially movable coupling body 14. Oblique guide grooves 15 are arranged in the coupling body 14, in which guide grooves 15 rotation axles 16 are guided tangentially with respect to the optical waveguide 8, the radial distance of the guide groove 15 from the optical waveguide 8 increasing toward the light-coupling end 17. Clamping rollers 18 are arranged on the rotation axles 16. Through a movement of the coupling body 14 in the axial direction toward the light-coupling end 17, the clamping rollers 18 move radially away from the optical waveguide 8 on account of the oblique course of the guide grooves 15. The optical waveguide 8 is free (insertion position). Through an axial movement of the coupling body 14 in the other direction, the clamping rollers 18 are moved radially against the optical waveguide 8, as a result of which the latter is clamped (clamping position).

To ensure that the coupling body 14 remains in the clamping position, a locking device can additionally be present that prevents a release of the blocking device. The latter can be opened, for example, by rotation about an axis that is oriented parallel to the optical waveguide 8.

The centering device 12 effects a coaxial orientation of the optical waveguide 8 with respect to the light-coupling optical unit 10, such that a maximum light transmission is ensured. To make matters clearer, an optical waveguide 8 is inserted in the optical waveguide receptacle 11 in the example, but it is not part of the invention.

The centering device 12 shown has two centering elements 19 which, in the example, are arranged opposite each other on the optical waveguide receptacle 11, such that an optical waveguide 8 lies between the two centering elements 19.

The centering elements 19 are L-shaped, wherein a first, shorter limb 20 points with its tip 21 in the direction of the light-coupling optical unit 10 and bears on the optical waveguide 8, and a second, longer limb 22 is arranged at right angles to the first limb and points radially outward.

At the L bend 23, the centering elements 19 are mounted rotatably at a pivot point 24 tangentially with respect to the optical waveguide 8. The first limb 20 can thus be pivoted in the radial direction to the optical waveguide 8.

The centering device 12 moreover has a ring-shaped transmission element 25, which is arranged coaxially with respect to the optical axis 26, and the optical waveguide receptacle 11 is guided coaxially through the ring opening. At a first end, it has a radially outwardly protruding edge 27. With this edge 27, the transmission element 25 bears on the second limbs 22 of all the centering elements 19. At its second end, the transmission element 25 has, on its inner circumference, a sliding surface 28 which, with an opposite sliding surface 29 of the coupling body 14, forms a sliding guide. The sliding surfaces as preferably dimensioned as a clearance fit. By the use of this sliding guide, the transmission element 25 is axially movable with respect to the coupling body 14 in a linearly guided manner. On account of the narrow tolerances of the clearance fit, this sliding guide has a small radial play.

The coupling device 9 has a helical spring 30, which is arranged coaxially with respect to the optical axis 26 and bears at one end on the edge 27 of the transmission element 25. The other end of the helical spring 30 is supported on a coupling part 34 of the blocking device 13. The spring force thus applies a force to the transmission element 25 in the direction of the light-coupling optical unit 10. Moreover, it acts in the opposite direction on the blocking device 13.

The spring force moves the transmission element 25 in the direction of the light-coupling optical unit 10. The deflection at the pivot point 24 brings about a radially inward movement of the respective first limbs 20. In the rest position, without an inserted optical waveguide 8, the two centering elements 19 are deflected by the spring force to such an extent that the respective tips 21 of the first limbs 20 touch each other. By the centered insertion of an optical waveguide 8, the limbs are then moved radially outward in a uniform and synchronous manner. Since all the centering elements 19 are acted upon simultaneously and uniformly by the transmission element 25, a movement of the centering elements 19 takes place synchronously and symmetrically. Thus, the optical waveguide 8 is always centered exactly coaxially with respect to the optical axis 26.

In the example, the opposite sliding surface 29 on the coupling body 14 is axially shorter than the sliding surface 28 of the transmission element 25. If, for example, an individual centering element 19 is now deflected radially outward, for example as a result of skewed insertion of an optical waveguide 8, this movement is passed to the transmission element 25. However, on account of the short opposite sliding surface 29 and the clearance fit, this one-sided application of axial force to the transmission element 25 leads to a tilting movement of the transmission element 25 and not to a sliding movement. In this case, the centering device 12 blocks and prevents further deflection of the individual centering element 19 and, therefore, wedging of the optical waveguide 8 during insertion.

Figure 4:
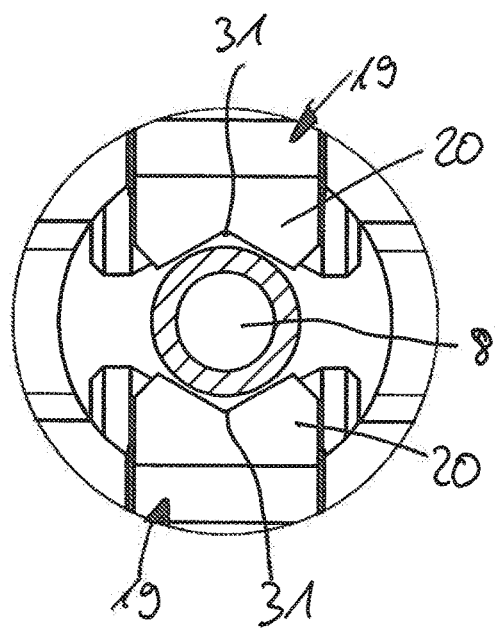
FIG. 4 shows a detail of the centering device of a coupling device with two centering elements.

To facilitate the insertion of an optical waveguide 8, the first limbs 20 of the centering elements 19 can each have axial receiving grooves 31, as shown in FIG. 4. The receiving grooves 31 prevent the optical waveguide 8 from slipping out laterally.

Figure 3:
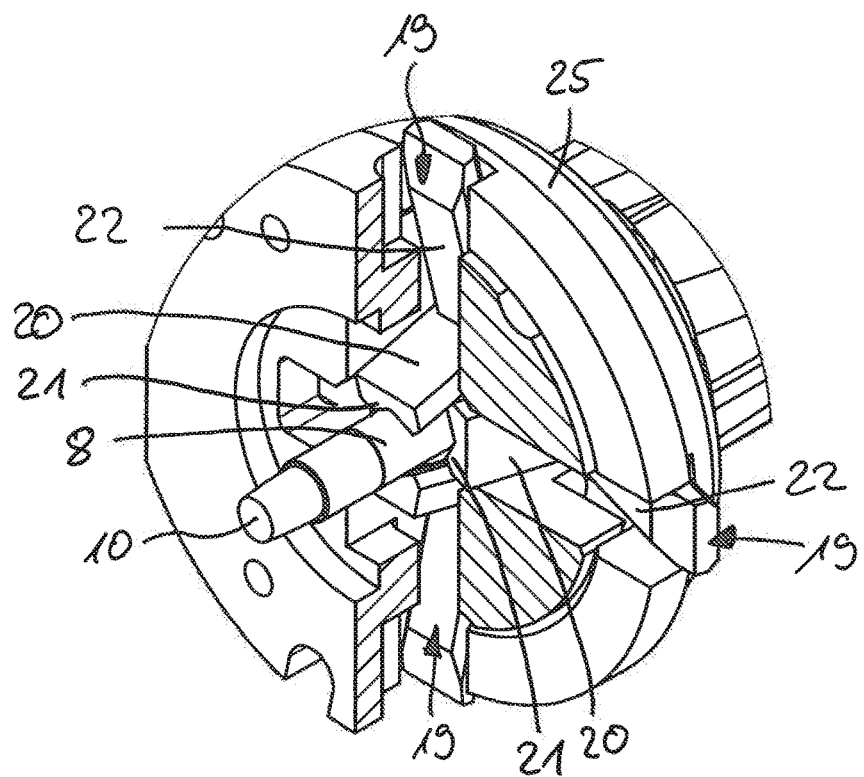
FIG. 3 shows a partially sectioned detail of the centering device of the coupling device of FIG. 1.

FIG. 3 shows a partially sectioned view of a coupling device 9 according to the invention with four centering elements 19, which are each arranged uniformly at a 90° angle to each other around the optical waveguide receptacle 11. To ensure that the first limbs 20 bearing on the optical waveguide 8 do not touch each other, the first limbs 20 have different lengths here. The tips 21 of the first limbs 21 thus bear on the optical waveguide 8 at different axial planes. In the example, two opposite first limbs 20 each have the same length, which differs from the length of the other limb, such that the first limbs 20 do not touch each other.

It is moreover advantageous if the pivot points 24 of all the centering elements 19 lie at the same axial position.

Alternatively or additionally to the different lengths of the first limbs, the pivot points of the centering elements can also lie at different axial planes.

It is important in each case simply that the second limbs 22 each bear on the transmission element 25, such that they are acted upon in a uniform manner.

Figure 5:
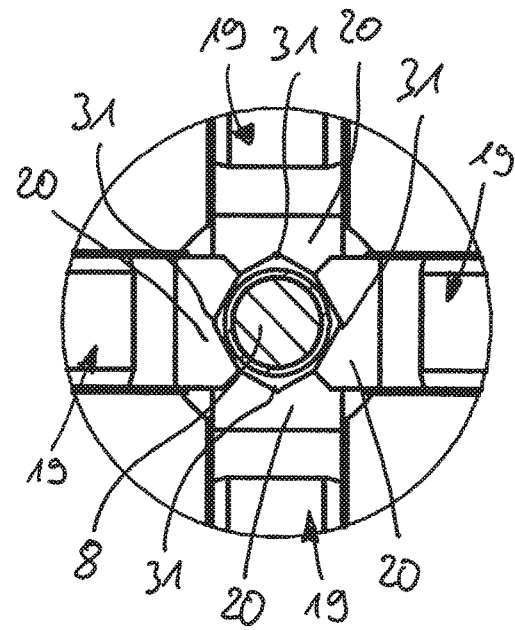
FIG. 5 shows a detail of the centering device of a coupling device with four centering elements.

In this embodiment too, as is shown in FIG. 5, the first limbs 20 each have axial receiving grooves 31, which simplify the insertion of an optical waveguide 8.

Figure 6:
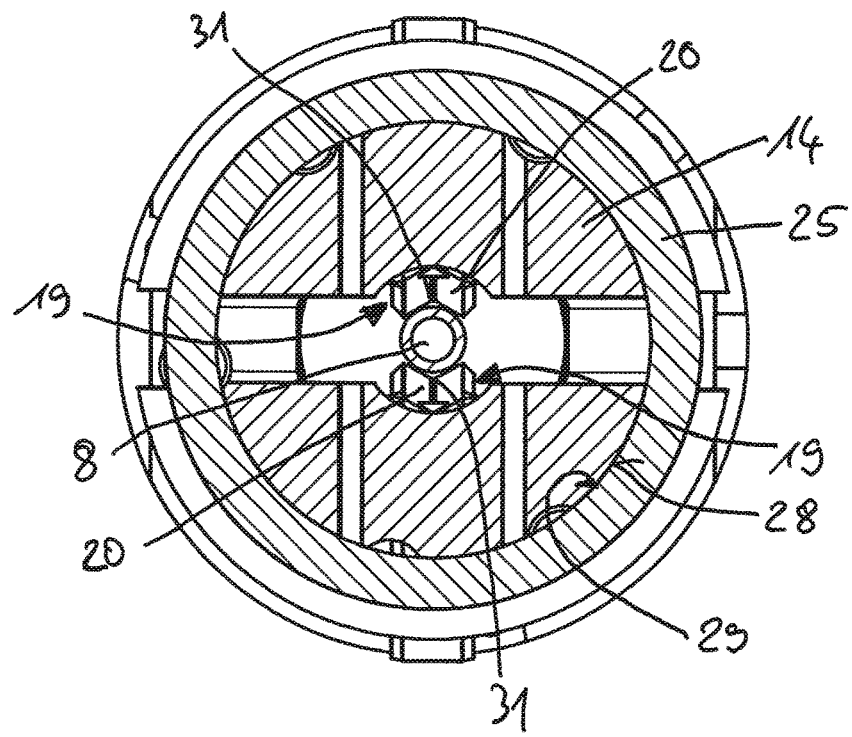
FIG. 6 shows a cross section of the centering device of a coupling device with two centering elements.

FIG. 6 shows a cross section through an embodiment of a coupling device 9 according to the invention with two centering elements 19. Here, the transmission element 25 is ring-shaped and, as has already been shown in FIG. 1, has a sliding surface 28 on its inner circumference. The opposite sliding surface 29 is arranged on an outer circumference of the coupling body 14, which is here arranged inside the transmission element 25.

Figure 7:
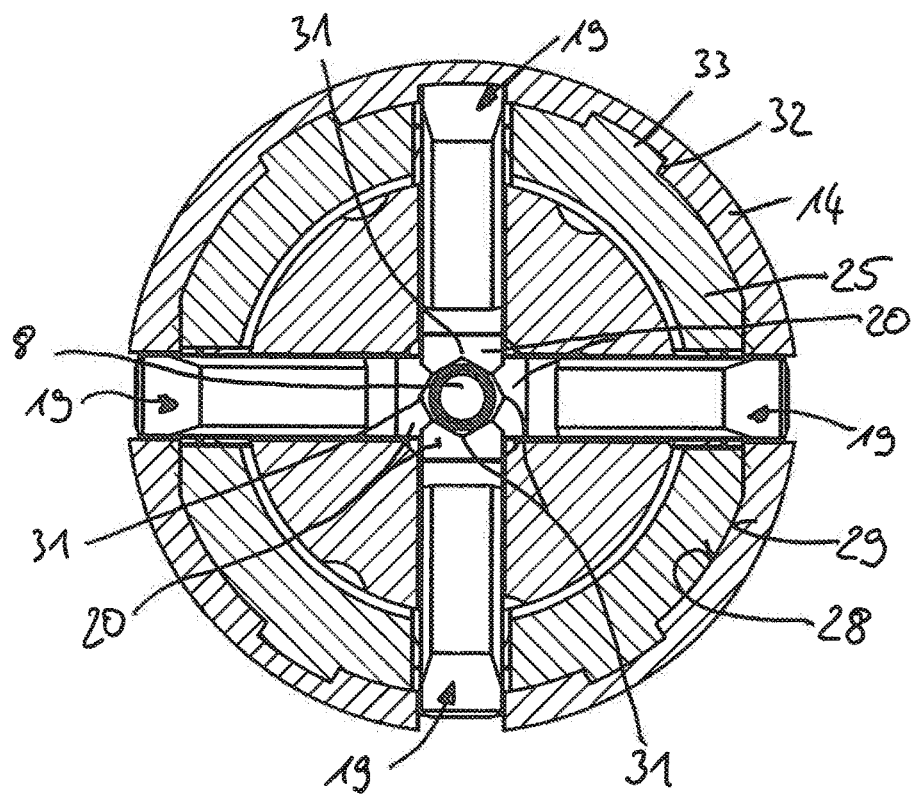
FIG. 7 shows a cross section of the centering device of a coupling device with four centering elements.

An alternative embodiment of a coupling device 9 according to the invention is shown in FIG. 7. Here, the transmission element 25 is likewise ring-shaped. However, the coupling body 14 is arranged outside the transmission element 25. The sliding surface 28 of the transmission element 25 is therefore arranged on the outer circumference, and the matching opposite sliding surface 29 is arranged on an inner circumference of the coupling body 14. Here, the sliding guide additionally has axially extending grooves 32 and springs 33 which prevent turning of the transmission element 25. This embodiment again has four centering elements 19, although the number of the centering elements 19 has no connection with the arrangement of the sliding surfaces 28, 29.

It would therefore also be possible to use only two centering elements 19 in this embodiment. The embodiment in FIG. 6 could likewise be realized with four centering elements 19.

The invention thus describes a coupling device 9 for an optical waveguide 8, in particular for an endoscope 2 or a light source 3, having an optical waveguide receptacle 11 aligned with a light-coupling optical unit 10, and having a centering device 12 for aligning an optical waveguide 8 with respect to the optical axis 26, wherein the centering device 12 has at least two transmission elements 25 acted upon by a spring 30, and has centering elements 19, and wherein the spring force is distributed by a transmission element 25 uniformly to all the centering elements 19.

LIST OF REFERENCE SIGNS 1 endoscope arrangement
2 endoscope
3 light source
4 endoscope shaft
5 endoscope head
6 eyepiece
7 optical waveguide input
8 optical waveguide
9 coupling device
10 light-coupling optical unit
11 optical waveguide receptacle
12 centering device
13 blocking device
14 coupling body
15 guide groove
16 rotation axle
17 light-coupling end
18 clamping roller
19 centering element
20 first limb
21 tip
22 second limb
23 L bend
24 pivot point
25 transmission element
26 optical axis
27 edge
28 sliding surface
29 opposite sliding surface
30 helical spring
31 receiving grooves
32 groove
33 spring
34 coupling part

The invention claimed is:

1. A coupling device (9) for an optical waveguide (8) with a light-exit optical unit (10), the coupling device comprising: an optical waveguide receptacle (11) aligned with the light-exit optical unit (10), a centering device (12) with at least two force-actuated centering elements (19) arranged around the optical waveguide receptacle (11) and adapted to center an optical waveguide (8) inserted in the optical waveguide receptacle (11) with respect to an optical axis (26) of the light-exit optical unit (10), the centering device (12) including a transmission element (25) that is movable in a guided manner and arranged between the centering elements (19) and an actuation force, such that the centering elements (19) are simultaneously force-actuated.

2. The coupling device (9) as claimed in claim 1, further comprising a sliding guide by which the transmission element (25) is guided in a linearly movable manner.

3. The coupling device (9) as claimed in claim 1, wherein the transmission element (25) is ring-shaped, and the optical waveguide receptacle (11) is guided through a central opening of said ring shape.

4. The coupling device (9) as claimed in claim 1, wherein the centering elements (19) each have two limbs and a pivot point (24) located between said two limbs, with a first one of the limbs (20) bearing on an inserted optical waveguide (8) and a second one of the limbs (22) being acted upon by the transmission element (25).

5. The coupling device (9) as claimed in claim 1, wherein the centering elements (19) are each L-shaped.

6. The coupling device (9) as claimed in claim 5, wherein a pivot point (24) is arranged at a bend of the L-shape.

7. The coupling device (9) as claimed in claim 1, wherein the transmission element (25) is acted upon by an individual spring.

8. The coupling device (9) as claimed in claim 7, wherein the individual spring is a helical spring (30).

9. The coupling device (9) as claimed in claim 1, further comprising a blocking device (13) formed upstream from the centering device (12) in the insertion direction, said blocking device (13) allowing the inserted optical waveguide (8) to be blocked in the optical waveguide receptacle (11).

10. The coupling device (9) as claimed in claim 9, wherein the blocking device (13) is actuatable by a spring force.

11. The coupling device (9) as claimed in claim 4, wherein the limb (20) of the centering element (19) facing toward the optical waveguide (8) has a receiving groove (31) which extends in an axial direction and in which the optical waveguide (8) bears in a fixed position in order to avoid slipping out transversely with respect to a direction of extent.

12. An endoscope (2) comprising a coupling device (9) as claimed in claim 1.

13. A light source (3) comprising a coupling device (9) as claimed in claim 1.

14. An endoscope arrangement (1) having an endoscope (2) and a light source (3), the endoscope and the light source each including the coupling device according to claim 1.

* * * * *